E. F. MILLARD.

WOOD GRINDING APPARATUS.

No. 11,590. Reissued Mar. 2, 1897.

WITNESSES.

A. D. Brown

Francis C. Stanwood

INVENTOR.

Edward F. Millard.

By H. E. Lodge, Atty.

UNITED STATES PATENT OFFICE.

EDWARD F. MILLARD, OF JACKSON, MICHIGAN.

WOOD-GRINDING APPARATUS.

SPECIFICATION forming part of Reissued Letters Patent No. 11,590, dated March 2, 1897.

Original No. 567,720, dated September 15, 1896. Application for reissue filed November 23, 1896. Serial No. 613,187.

*To all whom it may concern:*

Be it known that I, EDWARD F. MILLARD, a citizen of the United States, residing at Jackson, in the county of Jackson and State of Michigan, have invented certain new and useful Improvements in Wood-Grinding Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to apparatus for grinding or reducing blocks of wood into their fibrous constituents, commonly termed "wood-pulp," and known as "mechanical wood-pulp."

In the above class of apparatus a single rotary grinder is equipped with a frame carrying a series of hoppers located circumferentially of the grinder, while within said hopper are placed blocks of wood. These blocks are to be fed or thrust by suitable mechanism against the running-face of the grinder, and in this way the pulp is produced. Since the wood is confined within the hopper and forced forward by the "follower," so termed, it is evident great friction occurs between said blocks and the back plate of the hopper, because this element or back plate serves to resist the thrust which the stone exerts against the wooden block. The object of my invention is to obviate such friction and thereby avoid and prevent any irregularity in the feed-movement of the block which heretofore has occurred. To carry out my invention, I propose to equip or provide the back plate wholly or in part with a movable antifriction feed-surface, whereby said surface shall move approximately at the same rate of speed as that of the block. Hence the latter is free to move toward the grinder or stone without sliding friction against the back plate of the hopper, and its motion is steady or uniform, while at the same time less power is required to produce the feed-movement, which is effected by the follower and its actuating mechanism.

Figure 1:
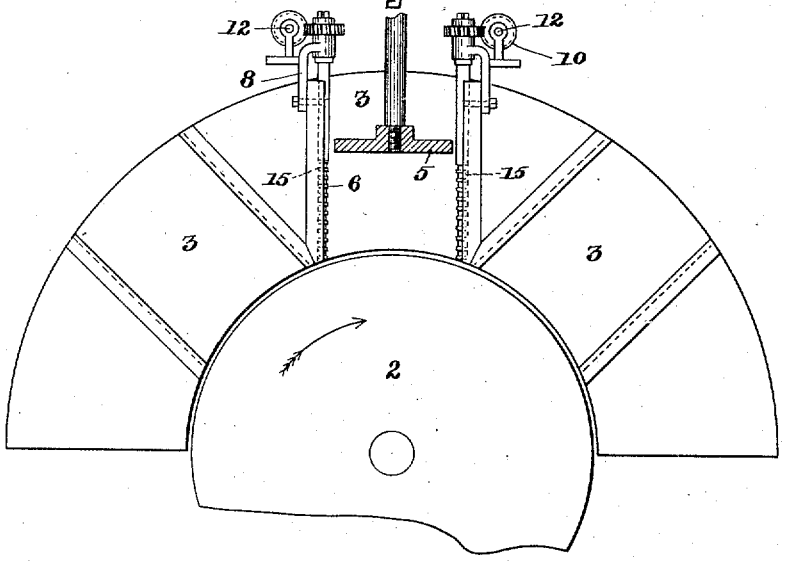
Figure 2:
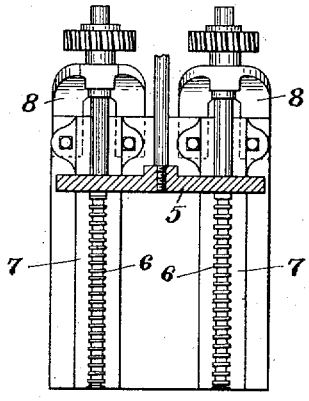
Figure 3:
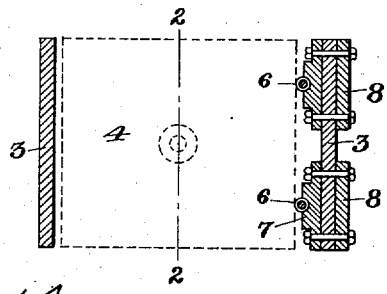
Figure 4:
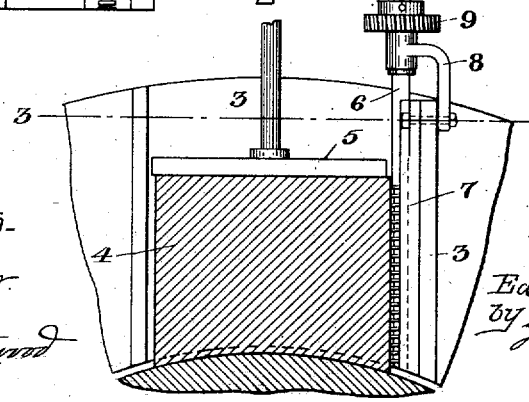

The drawings herewith presented represent, in Figure 1, a vertical longitudinal section of apparatus embodying my invention; Fig. 2, a vertical section on line 2 2 in Fig. 3. Fig. 3 is a sectional plan on line 3 3 in Fig. 4. Fig. 4 is a vertical longitudinal section of a construction wherein the feed-screws are located on one side of the hopper.

In said drawings I have shown the primary coöperating parts of "wood-grinding apparatus," so called, used in the production of mechanical wood-pulp. This apparatus comprises a rotary disk or stone 2, about which are arranged one or more hoppers 3. These hoppers are preferably metallic boxes, in which the blocks of wood 4 are to be placed and then forcibly pressed against the grinder or disk by a follower 5, operated in the manner now usually adopted in machines of this class, preferably hydraulic. As will be seen by the arrow, the grinding-disk is revolving in the direction indicated. Hence the block of wood is pressed against that wall of the hopper called the "back plate;" but since the follower is advanced radially against the grinder, friction must necessarily ensue between the block of wood and said back plate. To obviate this friction and to enable the block or blocks to advance fr ely and easily, and thus produce a constant uniform feed motion without hitch or disturbance, I provide the back plate in the present instance with a moving bed-surface. This surface comprises revoluble feed-screws 6, which are to project above the normal surface of the same plate and are to support the block of wood. In one instance (see Fig. 4) I have shown this rotary feed in the shape of screw-threaded rods affixed upon a plate 7, bolted to the back plate, while a sleeve-post 8, likewise bolted exteriorly to the back plate, serves to hold each screw in a fixed relative position with respect to the hopper. At the same time said screw is free to rotate.

Rotation of the screw is produced by means of a worm-gear 9, a worm 10, and an actuating-shaft 12 to some prime motor. It is obvious that by means of cone-pulleys or otherwise the rotary movement of the screws may be varied to suit the degree of hardness and the consequent rate of reduction of the wood block, but as I consider this forms no part of my present invention illustration of such mechanism has been omitted. These screws are to be so positioned that they tend to advance the wood in the proper direction, and said screws are to have such rotation that the block will move forward freely upon said screws as the follower pushes it. Said rods 6 may be screw-threaded only in part or along that portion which is in contact with the blocks of wood.

In the drawings one form of construction is shown in Fig. 1, where the screw-threaded rods are to be positioned in grooves 15, cut longitudinally in the wall-plates of the hopper, and said rods are to extend to a point flush with that end of the hopper which is adjacent to the stone. In this illustration, Fig. 1, it will be seen that the screws forming the moving feed-surface are positioned on both sides of the metallic box or hopper.

This method of construction, as above illustrated, is intended to obviate friction when in lieu of a single block a plurality of blocks is entered, as frequently happens, in which event their combined dimensions might create excessive friction unless provided for by the feed-surfaces on the two plates. This arrangement, however, is merely a duplication of these same parts, as shown in Fig. 3, where the moving feed-surface occurs on but one side of the hopper. Whenever this feed-surface is produced by means of rotary screw-threaded rods, it is preferable that their arrangement should be such that their rotation shall impart a straight forward thrust to the blocks within the hopper and in process of grinding.

By reference to Figs. 2 and 3, where only one side of the hopper is equipped with a feed-surface composed of the two parallel rods 6 6, I have shown the rods as both right screws. This desired straight feed thrust is most efficiently produced by right and left screw-threads. With the construction as in Fig. 1, where the rods on one side are counterparts of those on the other, the same relation right and left is to be maintained. Hence the effect of the screw rotation is offset and the block or blocks balanced with the result that the block or blocks are thrust forward in straight-line movement without a tendency to move laterally. However, I do not confine myself to any one precise mode of arranging said screws, since even if not disposed in the exact manner as set forth they will still be able to perform their special duties, but perhaps not quite so efficiently.

In some instances I propose to attach the moving feed-surface in the shape of two screw-threaded rods to a plate 7, which is bolted to the back plate. The rod 6, as heretofore described, rests in a groove cut in said plate 7, while a sleeve-post 8, likewise bolted exteriorly to the back plate, serves to hold each screw in a fixed relative position with respect to the hopper, while at the same time said screw is free to rotate. These results are produced by means of two collars fast to said rod 6 on either side of the sleeve-post 8.

I do not desire to be limited to the precise form of feed, neither to the number of screw-threaded rods, nor to the shape of the screw-thread or the pitch of the same, since each and several of these specific features may be varied without departing from the spirit of my invention, which consists in creating or providing the back plate of the hopper with a movable feed-surface, which is to support the block of wood and which is to travel with the wood as it is advanced by the follower toward the grinder or stone.

By providing a screw as a feed-surface it is evident that this element may extend the full length of the hopper, quite to the grinding-disk. This is of great importance, since it serves to support the block and maintain the latter in a fixed position, thereby preventing it from tipping or tilting, and said moving feed-surface continues to perform its duties and functions until the block of wood is entirely reduced.

What I claim is—

1. In wood-grinding apparatus a hopper to contain the wood blocks in process of reduction, provided with one or more moving feed-surfaces upon which said block is made to rest and travel, said feed-surfaces being fixed relatively with respect to the hopper, substantially as stated.

2. In wood-grinding apparatus, a hopper for wood blocks, a back plate, and a moving feed-surface as a part of said back plate to support said blocks, and mechanism to move the feed-surface to obviate friction produced by the forward travel of the blocks, substantially as explained.

3. In grinding apparatus, a revoluble grinder, a hopper coöperating with said grinder, a back plate to support the wooden block against the thrust of the grinder, combined with a follower to push the block toward the grinder, and a feed device forming a surface portion of the back plate and movable with the block, substantially as described.

4. The combination with a revoluble grinder, one or more hoppers circumferentially of the grinder, a follower for each hopper, mechanism for actuating said follower, and a movable hopper-surface comprising one or more stationary screws for rotation, a sleeve-post to prevent endwise movement of the screw, and mechanism for producing rotation of the screws, substantially as set forth.

In testimony whereof I affix my signature in the presence of two witnesses.

EDWARD F. MILLARD.

Witnesses:
H. E. LODGE,
FRANCIS C. STANWOOD.